July 23, 1940.　　　R. E. NORMANDIE　　　2,209,017
STORAGE BATTERY TERMINAL CLAMP
Filed April 8, 1940
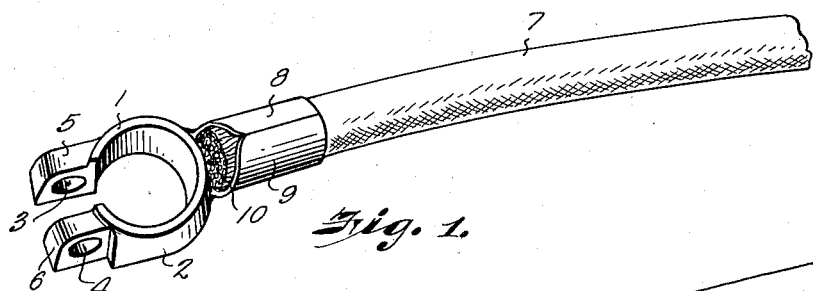
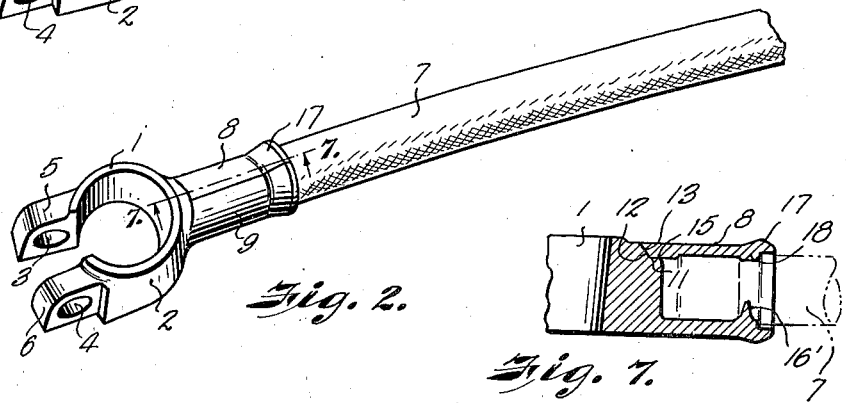
INVENTOR
Robert E. Normandie
BY
ATTORNEY Patented July 23, 1940

2,209,017

UNITED STATES PATENT OFFICE 2,209,017

STORAGE BATTERY TERMINAL CLAMP

Robert E. Normandie, Kansas City, Mo., assignor to Standard Brass Manufacturing Company, Kansas City, Mo., a corporation of Missouri Application April 8, 1940, Serial No. 328,397

1 Claim. (Cl. 173—259)

My invention relates to storage battery terminal clamps, and more particularly to a novel clamp construction adapted to connect conductors to the terminals of storage batteries.

Battery clamps are well known to the art. They comprise a means for electrically contacting and holding one end of a conducting cable and means for clamping the cable holding portion to a terminal of a storage battery.

Storage batteries commonly in use today are the lead oxide sulphuric acid type, and especially in automotive vehicles there is apt to be leakage of the acid electrolyte with a resulting corrosion of the battery terminal clamps. The corrosion usually takes place at the junction between the clamp proper and the cable holding portion of the clamp, due to the fact that a space exists in the clamps of the prior art at this point, in which space acid collects. Once the corrosion starts, the sulphates produced seem to act as a corrosion accelerating catalyst and the corrosion proceeds rapidly.

One object of my invention is to provide a battery terminal clamp in which the effects of spilling or leakage of acid are minimized.

Another object of my invention is to provide a battery terminal clamp in which the weak spot in the prior art construction is eliminated.

Other and further objects of my invention will appear from the following description.

In the accompanying drawing which forms part of the instant specification and is to be read in conjunction therewith, and in which like reference numerals are used to indicate like parts in the various views;

Fig. 1 is a perspective view of a battery terminal clamp of the prior art.

Fig. 2 is a perspective view of a battery terminal clamp in electric cable conductor clamping position, showing one embodiment of my invention.

Fig. 3 is a top plan view of a battery terminal clamp before the conducting cable is connected thereto.

Fig. 4 is a perspective view of the clamp shown in Fig. 3.

Fig. 5 is a sectional view taken on the line 5—5, Fig. 3.

Fig. 6 is an end view of the clamp shown in Fig. 3.

Fig. 7 is a sectional view taken on the line 7—7, Fig. 2.

Referring now to the drawing, Fig. 1 shows one type of battery terminal clamp of the prior art. The arms 1 and 2 are adapted to be clamped around a battery terminal by means of a nut and bolt, the bolt passing through holes 3 and 4 in the lugs 5 and 6. The cable conductor 7 is stripped of its insulation at the end and the end is clamped by bending metal wings 8 and 9 over the bare end of the cable. It will be observed that there is a space 10 formed between the arms 1 and 2 and the wings 8 and 9. Acid present will collect in this space, corroding the junction between the wings 8 and 9 and the arms 1 and 2.

I have discovered that if I can keep acid out of this space that the battery terminal clamps will last a long time, since any acid which may be inadvertently spilled can be easily wiped off.

Referring now to Fig. 2, in which I show a view similar to Fig. 1 in a battery terminal clamp embodying my invention, it will be seen that the space 10 is not present. I accomplish this by providing a shoulder 11 and an inclined surface 12 adapted to co-act with inclined surfaces 13 and 14 on the wings 8 and 9 of the cable clamp, and the ledges 15 and 16 on the wings of the cable clamp. The arrangement is such that when the end of the conducting cable is inserted between the wings, the wings may be crimped over as shown in Figs. 2 and 7. When they are crimped the inclined surfaces 13 and 14 are seated upon the inclined surface 12, while the ledges 15 and 16 are seated upon the shoulder 11.

Since the clamp is made out of brass, composition or other ductile material, a very close fit may be obtained. If desired the battery terminal may be tinned or otherwise coated with metal to completely seal the junction.

If acid is spilled on the battery terminal it can be easily wiped off as there are no interstices or reentrant portion in which it may collect.

In order to prevent the cable from pulling loose from the clamp, I may if I desire, provide a pin 16'.

Frequently the cables are bent to various positions and in order to preclude the movement in bending the cable from opening the seal, I may provide the terminal end of the cable lamping portion with a reinforced periphery of thickened metal 17. The periphery may be formed with an annular projection 18 adapted to further and securely clamp the cable to the battery terminal clamp proper.

It will be seen that I have accomplished the objects of my invention. I have provided a novel terminal cable clamp construction in which corrosion by acid leakage is greatly minimized. I have provided a battery terminal cable clamp in which the open space between the end of the cable and terminal clamp proper is eliminated.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, I claim:

In a battery terminal cable clamp having means for clamping a terminal of a storage battery and means for receiving the end of a cable to be connected to the storage battery, a body portion, clamping means extending from said body portion in one direction, cable receiving means extending from said body portion in the opposite direction, said cable receiving means including a U-shaped member formed with a pair of wings adapted to be deformed around the end of the cable to be connected, said wings being of such height that when deformed their longitudinally extending edges will abut, means extending from said body portion into said U-shaped portion, said means being formed with a beveled surface and a substantially horizontal surface, the ends of said wings being formed with beveled edges adapted to seat on said beveled surface, the inside periphery of said wings adapted to seat on said horizontal surface, the construction being such that when said wings are deformed over the end of a cable the ends of said wings will be substantially sealed.

ROBERT E. NORMANDIE.